United States Patent
Wishon et al.

[15] 3,656,978
[45] Apr. 18, 1972

[54] FIRECLAY REFRACTORY ARTICLES

[72] Inventors: Berhl E. Wishon, Bethel Park; Donald P. Crosby, Pittsburgh, both of Pa.

[73] Assignee: Dresser Industries, Inc., Dallas, Tex.

[22] Filed: Apr. 6, 1970

[21] Appl. No.: 31,069

Related U.S. Application Data

[62] Division of Ser. No. 734,268, June 4, 1968, Pat. No. 3,527,450.

[52] U.S. Cl. ............................................................106/67
[51] Int. Cl. ........................................................C04b 33/00
[58] Field of Search ...........................................106/65, 67

[56] References Cited

UNITED STATES PATENTS

| | | | |
|---|---|---|---|
| 2,852,401 | 9/1958 | Hansen et al. | 106/65 |
| 3,378,384 | 4/1968 | Stein | 106/65 |

Primary Examiner—James E. Poer
Attorney—Robert W. Mayer, Raymond T. Majesko and David C. Hanson

[57] ABSTRACT

Fireclay refractory shapes bonded with alumina trihydrate and phosphoric acid.

2 Claims, No Drawings

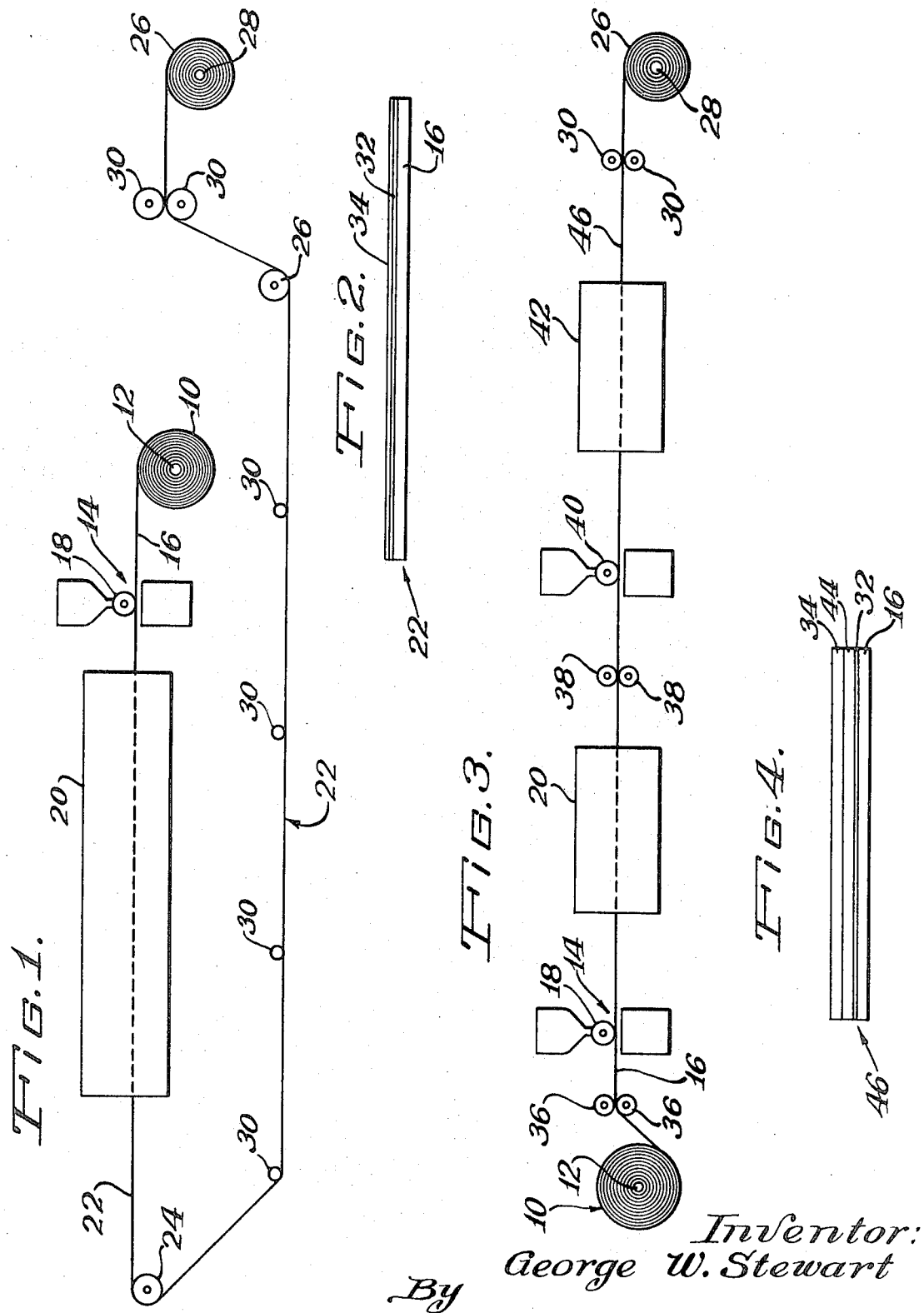

FIRECLAY REFRACTORY ARTICLES

This is a division of application Ser. No. 734,268, filed June 4, 1968, now U.S. Pat. No. 3,527,450.

In preparing a charge for the contemporary oxygen steelmaking vessels, the raw materials are generally melted in a blast furnace or the like. The molten charge is then tapped and transferred to torpedo cars which maintain the charge in a molten state and deliver it to the oxygen steelmaking vessel site. Thereupon, the molten metal is poured into iron charging vessels which ultimately transfer the molten metal to the oxygen steelmaking vessels.

Iron or steel charging ladles are cylindrical vessels, open at the top, and consist of an outer metal shell and refractory lining adjacent the shell. One type of charging ladle contains a pouring lip and slag cup at the open top and the charge is transferred generally by tilting the vessel or ladle. Another type is of the bottom pour construction containing a stopper arm and rod assembly and refractory nozzle at the outlet.

When the molten charge is transferred from the torpedo cars to these ladles, generally a distance of about 30 to 40 feet separates them. Thus, when the molten metal flows into the ladles from the torpedo cars, it does so with such disruptive force that the lining life, particularly of the bottom of the ladle is very short. The molten metal quickly erodes the mortar material between the refractory brick washing it out and also damaging the brick.

In an effort to increase the service life of refractory bottoms in these ladles, a number of different refractory linings were tried. The earliest linings in the bottoms of iron charging ladles consisted of different grades or qualities of fireclay brick. However, the maximum number of heats available with these bottoms was about 60. Steel makers then tried high MgO basic brick linings and averaged between 30 and 160 heats. Fireclays are used to make many types of refractory brick. However, it has been difficult to fabricate phosphate bonded fireclay brick for use in ladle linings, especially when made with crude hard or flintlike fireclays, since they do not react with the phosphate materials sufficiently to form the desired bond. Also, the crude clays have an affinity for liquid phosphates and tend to absorb them rapidly. By "hard or flintlike" fireclay, it is meant a clay which has low material plasticity and which usually breaks with a smooth or conchoidal fracture.

Phosphate bonding agents include phosphoric acid and a wide range of water soluble phosphates which yield $P_2O_3$ in aqueous solution. Such soluble solutions include various alkali metal and alkaline earth metal salts of phosphoric acid, ammonium salts of phosphoric acid, and the like.

In order to facilitate the bonding of high alumina refractories, particularly the unconsolidated plastics and castables, it has been suggested, that alumina hydrate be employed in the mix as the reactive ingredient for the phosphoric acid. For example, in U.S. Pat. 2,852,401, assigned to the present assignee, there is disclosed an unconsolidated mixture of 65 percent inert refractory aggregates, up to 35 percent hydrated alumina and 2 to 15 percent of 85 percent phosphoric acid which mixture is dried at a temperature not exceeding 125° F. In U.S. Pat. 3,284,218, also assigned to the present assignee there is disclosed a refractory castable consisting of tabular alumina, hydrated alumina and phosphoric acid. These refractories are of a high purity system wherein the alumina content is in excess of 95 percent.

Accordingly, it is an object of the present invention to provide an improved refractory construction for iron charging ladles.

Other objects of the invention will, in part, become apparent hereinafter.

Briefly, an iron charging ladle, consisting of an outer metal shell and a refractory lining in contact therewith, may be divided generally into three major zones; the upper zone, the barrel zone and the bottom zone. The refractory lining, according to the present invention is composed of a plurality of courses of fireclay refractory shapes. The shapes are made from a batch consisting essentially of, by weight, an aluminous material in an amount sufficient to provide about 2 to 10 percent alumina trihydrate. The balance of the batch consists of a crude, hard refractory fireclay or fireclays which in combination analyze less than about 40% $Al_2O_3$ on a dry basis. The entire batch analyzes on an oxide, ignition free basis, less than about 45% $Al_2O_3$. The batch is bonded with $P_2O_5$ in an amount equivalent to that provided by about 5 to 12 percent, preferably 5 to 7 percent, based on the total weight of the batch, of phosphoric acid having an 85 percent concentration.

It is also preferred that the alumina trihydrate containing material does not exceed about 15 percent of the batch. Greater amounts of such material in combination with 12 percent phosphoric acid (85 percent) causes the batch to resist flow into the brick mold box and inhibits fabrication of the brick.

The batch is compressed into shapes to form a self-sustaining body or brick and dried at a temperature of at least about 450° F. The brick may be burned before use, if desired, or employed after drying.

The uncalcined aluminous material is chosen to contribute alumina trihydrate to the batch. A material which is largely alumina trihydrate may be employed. A suitable pure alumina trihydrate is C-31 material, a proprietary product of the Aluminum Company of America. A material containing alumina trihydrate as one of its constituents may be employed, for example, crude bauxites and kaolinitic bauxites. The latter are bauxites containing substantial amounts of kaolinite or other clay minerals. Suitable materials are the crude bauxites imported to the United States for use in the Bayer Process such as, crude South American bauxite. These typically analyze 85 to 90% $Al_2O_3$, on a calcined basis. Much of their alumina content generally derives from alumina trihydrate. Equally suitable and more economical for most of the examples, referred to later, are the domestic bauxites (U.S.A.) and kaolinite bauxites, such as, those mined in Alabama. These are comprised mostly of alumina trihydrate and kaolinite.

Phosphoric acid of any concentration available, that can be handled, may be employed in the present invention as long as the stated range, based on $P_2O_5$ content, is not exceeded. For 85 percent concentration phosphoric acid used in the range of 5 to 12 percent, the $P_2O_5$ ranges from about 3 to 7, since this phosphoric acid analyzes about 62% $P_2O_5$. Phosphoric acid of 75 percent concentration contains about 55% $P_2O_5$, 105% concentration contains about 76 percent; and 115 percent concentration contains about 83% $P_2O_5$.

The shapes must be dried at a temperature of at least about 450° F to form the desired bond. X-ray diffraction studies suggest that it is necessary, in order to obtain the strengths desired, that the alumina trihydrate and phosphoric acid combine to form aluminum ortho-phosphate.

In the following examples, mixes designated 1 and 2 of the analysis given in Table I below were prepared. The batch ingredients were size graded, mixed together, tempered with a small amount of water when necessary, pressed into shapes at pressures ranging from about 4,000 to 8,000 psi and dried at a temperature of 500° F.

TABLE I

| Mix: | 1 | 2 |
|---|---|---|
| Pennsylvania hard clay (−4 mesh) | 97% | 95% |
| Crude Alabama bauxite | 3 | 5 |
| Phosphoric acid (85% concentration) | 5 | 7 |
| $Al_2O_3 \cdot 3H_2O$ content | 2 | 3.4 |

After drying the shapes were tested and found to have a linear change of −0.6 percent and −0.4 percent, a bulk density (Pcf) of 142 and 140 and a room temperature modulus of rupture of 840 and 1030, respectively.

The typical size grading (Tyler series) of the above mixtures is shown in Table II below.

TABLE II

| Screen Analysis | Percent |
|---|---|
| −6 + 28 mesh | 40% |

−28 + 65 mesh　　10%
−65 mesh　　50%
40 to 60% of the −65 mesh material passes 325 mesh.

The typical chemical analysis of the raw materials employed in the examples or otherwise useable is set forth in Table III below.

TABLE III.—RAW MATERIALS

| | Percent | | | | |
|---|---|---|---|---|---|
| | Missouri flint | Pennsylvania hard clay | Crude kaolinitic bauxite | Crude Alabama bauxite | C-31 hydrated alumina |
| Chemical Analysis: | | | | | |
| $Al_2O_3$ | 38.6 | 39.0 | 47.2 | 53.2 | 65 |
| $SiO_2$ | 43.9 | 41.6 | 29.1 | 18.0 | 0.04 |
| $TiO_2$ | 2.3 | 2.4 | 2.2 | 2.3 | |
| $Fe_2O_3$ | 0.9 | 1.9 | 1.0 | 1.0 | |
| CaO+MgO | 0.5 | 0.5 | 0.14 | 0.09 | 0.01 |
| Alkalies | 0.6 | 1.3 | 0.09 | 0.07 | 0.45 |
| Ignition loss, mostly $H_2O$ | 13.4 | 13.5 | 20.3 | 25.5 | 34.5 |
| Approximate $Al_2O_3 \cdot 3H_2O$ | | | 30–35 | 65–70 | 100 |

While the invention has been described with respect to iron charging ladles, it should be understood that it may be applied to other types of ladles, such as steel ladles, also.

Having thus described the invention in detail and with sufficient particularity as to enable those skilled in the art to practice it, what is desired to have protected by Letters Patent is set forth in the following claims:

1. A fireclay refractory shape made from a size graded refractory batch consisting essentially of, by weight, an aluminous material in an amount sufficient to provide about 2 to 10 percent alumina trihydrate, the balance being crude hard refractory fireclay analyzing less than about 40% $Al_2O_3$ on a dry basis, said batch being bonded with $P_2O_5$ in an amount equivalent to that provided by about 5 to 12 percent, based on the total weight of the batch, of phosphoric acid having an 85 percent concentration.

2. The shape of claim 1 in which the $Al_2O_3$ content on a calcined basis is less than 45 percent.

\* \* \* \* \*